INVENTOR
LOUIS SCHWAB

Nov. 26, 1968  L. SCHWAB  3,412,531
CLEANING THE AIR OF CIRCULATING AIR SYSTEMS
Filed March 15, 1966  2 Sheets-Sheet 2

INVENTOR
LOUIS SCHWAB
BY
ATTORNEYS

United States Patent Office

3,412,531
Patented Nov. 26, 1968

3,412,531
CLEANING THE AIR OF CIRCULATING AIR SYSTEMS
Louis Schwab, P.O. Box 5146, Orlando, Fla. 32805
Filed Mar. 15, 1966, Ser. No. 534,359
7 Claims. (Cl. 55—341)

ABSTRACT OF THE DISCLOSURE

A particle separating assemblage for purifying a particle laden air flow in which the particle laden air is directed into the intake ends of a plurality of adjacent filtering units. In these units, part of the air substantially liberated of particles such as dust escapes for further use and the remaining air flow now heavily laden with particles is discharged from the assembly through a disposal port via the discharge ends of the units, conduits interconnecting the units and a common discharge conduit.

---

This invention relates essentially to the removal of dirt from the air in circulating air systems. More particularly, it is directed to a system comprising an assemblage of air-permeable dirt-removing units disposed in the path of instreaming air, those units being connected with means for conveying, away from the units, a substantial amount of the dirt as it is removed from the instreaming air; and such units, per se.

The maintenance of circulating air systems for heating, cooling and ventilating which are provided with conventional air-filtering units (designated generally as filters) is beset with the important problem of replacing and/or cleaning them. When filters become clogged, the resistance to air flow increases until ultimately they become totally ineffective for removing the dirt entrained in the instreaming air.

In pondering over the problem of substantially reducing the need to change or replace the spent filters, it occurred to me that a solution of that problem might reside in providing means for conveying the dirt, as it it being removed by the filter from the instreaming air, away from the filter, rather than allowing the dirt to become lodged and accumulate therein.

It further occurred to me that since a vortical movement of the air is created within a filter of bag-like configuration with resultant concentration of the heavier particles into an axial path through the filter so that the dirt collects substantially at the apex thereof, I could arrange for the continued movement of that concentration by providing a port at the downstream end of the filter so that the dirt could pass out of the filter; and, by suitable means, be conveyed away therefrom. I visualized that such removal could be effected by providing a suitable conduit connected to the port, whereby the stream of dirt emerging from the filter could be piped away from the filtration system.

This invention arose from that conception.

Accordingly, a primary object of this invention is to provide for the removal of dirt from instreaming air in circulating air systems, used, e.g. for heating, cooling and ventilating, hereafter referred to as "circulating air systems," characterized by the feature that the dirt which is removed from the such air, by unique filtering units, is piped away from the filtration system.

In its fundamental aspects, the foregoing object is attained by a system which embodies an assemblage of air-permeable dirt-removing units of unique construction. The units are so shaped that substantial amounts of the dirt entrained in the instreaming air are concentrated into streams which can be piped away from the units. More particularly, that fundamental aspect of this invention is attained by providing an assemblage of such units, which are substantially bag-shaped filters or elements disposed in the intake chamber of a circulating air system, the assemblage of the units being arranged in the sealed relationship customary in this art. The downstream end of the unit is provided with a port or opening which communicates with a system of interconnected pipes that constitutes a piping assemblage which terminates in a duct that discharges into the outside air. The discharge duct may be provided with a barometric damper and/or an exhaust fan.

The dirt-removing units are desirably constituted of an inner wall and an outer wall spaced apart therefrom. The inner wall defines a substantially frustoconical structure disposed within the large outer wall. The two walls, however, are coterminous at the upstream and downstream ends.

In customary modes of operation, a fan or fans, of suitable size is, or are, positioned downstream of the downstream ends of the units.

In operation, the instreaming air is partitioned among the assemblage of the units, and a vortical movement takes place with resultant substantial concentration of the dirt into an axial path. As a consequence thereof, the axially moving streams of dirt emerge through the ports disposed at the apices of the units and are carried away through the aforementioned interconnected piping. The cleaned air passes through the air-permeable walls of units; and is carried through the heating, cooling or ventilating ducts. The captured dirt which is diverted to the interconnected piping is thus continuously withdrawn and discharged at a location isolated from the ventilating or heating system. Accordingly, the continuous removal of the dirt from the units results in a significant decrease in the number of removal, cleaning and replacement operations required in the system.

A further object of this invention is to provide a novel air filtration system which permits cleaned air passing through the dirt-removing assembly to be delivered to the heating, cooling or ventilating system, and to divert the dirt removed away from the cleaning system by providing bag-like units which impart vortical movement to the dirt significantly to reduce the amount of dirt lodged in the dirt-removing system, and thus to expedite the removal of the dirt from the air-cleaning system.

Another object of the instant invention is to provide a novel air-cleaning assemblage for circulating air systems, and the like, which comprises a plurality of bag-like, units each having an upstream opening for receiving incoming air, whereby air passing through its wall is cleaned and returned to the circulating air system, and further comprises a downstream port for withdrawing dirt diverted into a vortical path as a result of the bag configuration.

Still another object of the instant invention is to provide a novel air-cleaning assemblage for circulating air systems, and the like, which comprises a plurality of bag-like units each having an inner and outer wall of selected relative permeabilities to air, wherein air enters an upstream opening in the unit so that cleaned air passes through the inner and outer walls thereof in cleaned condition, and is delivered to the circulating air system; and wherein the dirt arrested by the inner wall is converged into a vortical path (due to the configuration of the inner wall), so as to pass through a downstream port and be carried away by a network of conduits.

Still another object of the instant invention is to provide a novel-air cleaning system wherein the network conduit system is provided with exhaust means of suitable capacity for withdrawing the dirt from the filter elements and through the conduit network.

These and other objects of the instant invention will become apparent when reading the accompanying description and drawings in which.

Figure 1:
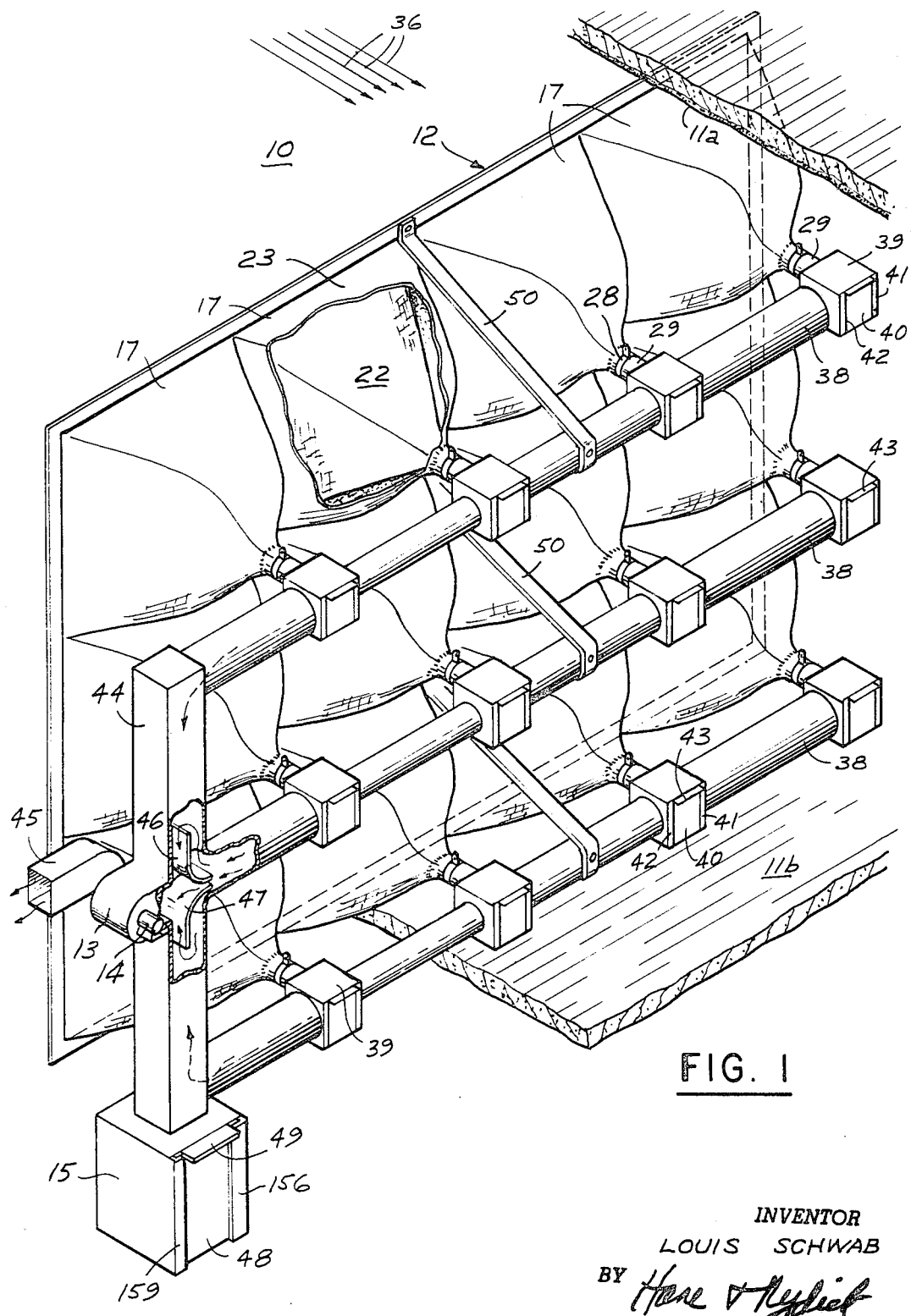
FIGURE 1 is a perspective view showing the filtering system designed in accordance with the principles of the instant invention.

FIGURE 1 shows in perspective view the dirt-removing or filtration system 10 which is designed in accordance with the principles of the instant invention. This system 10 is disposed in the air-intake chamber (a plenum) defined by the upper and lower horizontally aligned walls 11a and 11b, respectively. While the plenum is further normally defined by vertically aligned walls as well, these have been omitted for purposes of simplifying the figures.

A framework 12 for supporting the dirt-removing units 17 is positioned and secured within the plenum; and provides for positioning and supporting each of the individual air-permeable units 17, which are arranged in a planar array as shown in the figure.

THE UNITS

Figure 2:
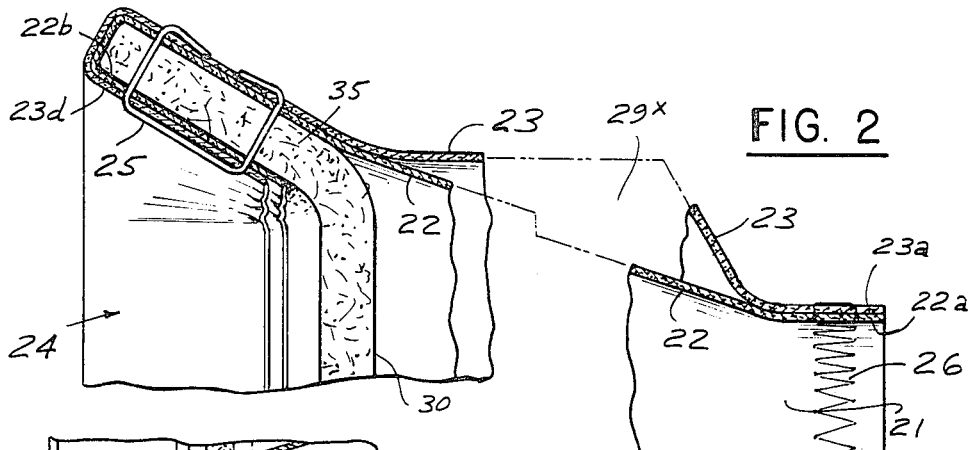
FIGURE 2 is a sectional view of a top portion of dirt-removing unit as it appears prior to insertion into the filtering system of FIGURE 1, for example.
Figure 3:
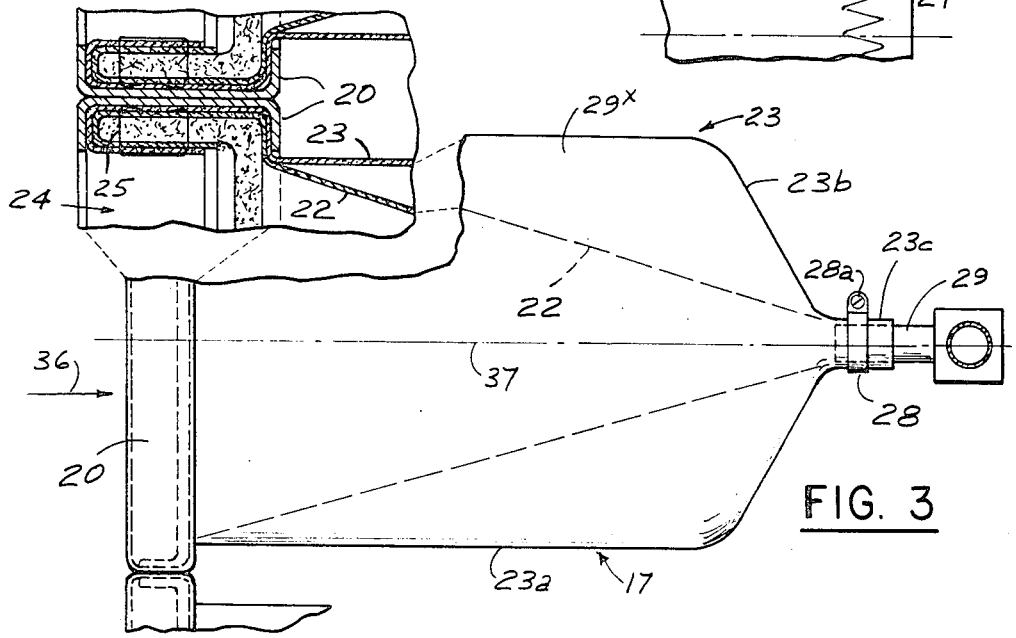
FIGURE 3 shows a side elevational view of one such unit after insertion into the system of FIGURE 1, for example, with a portion of FIGURE 3 showing an enlarged sectional view of an upstream end of the unit in order to more clearly show the supporting framework for the units.

Each unit 17, as best illustrated in FIGURES 2 and 3, made of porous fabric, comprises an outer element 23, the major portion of which is substantially tubular and comprises straight walls 23a, which taper at their right hand end 23b, and terminate in a relatively small open-end to form a down-stream neck 23c. The unit further comprises an inner element 22, which is substantially conical or pyramidal in shape, and, at its mouth 24, is co-terminous with the mouth of the outer element 23.

The inner element tapers or funnels down from its mouth 24 and terminates in a neck 21, which snugly nests within the neck 23c. The two necks may be conveniently stitched together as shown at 26 and constitutes means for snugly engaging a dirt-discharge pipe 29. The two necks are firmly secured to the outer wall of dirt-discharge pipe 29 by means of a strap or clamp 28, secured by a fastener 28a. Except for the joinder of the two elements at the mouths and necks thereof, they are spaced apart from each other, thus defining an air space 29x.

The upstream mouths of the two elements 22 and 23 are fastened to a base 30. This base, as shown herein, is constructed of a fiber board that is cut and bent to form the legs 31, 32, 33 and 34 (see FIGURE 4), each of which legs is bowed or arced as indicated at 35 of FIGURE 2. The upstream ends 23d and 22b of the outer and inner elements respectively, are wrapped around the front edge of the base 30 and are stapled thereto as at 25. As can best be seen from FIGURE 2, the front edges of the base 30 are flared generally outwardly prior to insertion of each unit 17 into the supporting framework 12.

THE ASSEMBLAGE OF THE UNITS

When a plurality of units 17 are mounted, as shown in FIGURE 3, in a frame comprising channels 20, the abutting front edges of the base 30, which are sealed within channels 20, constitute a self-sealing assemblage in consequence of the resiliency of the legs of the base. When fully assembled in a planar array as shown in FIGURE 1, they seal the plenum opening confronting the incoming air is thus cleaned by the units 17 as it passes there-dirt-laden air is drawn into the planar array and the cleaned air pulled away therefrom by suitable suction means (not shown), well-known in this art. The instream-ing air is thus cleaned by the units 17 as it passes therethrough for movement into the circulating air system.

The dirt-laden air, moving in the direction shown by arrow of FIGURE 3, enters into the upstream end of the assemblage of units 17. The premeability of inner element 22 permits the air to pass therethrough while blocking the passage of dirt and dust particles. The conical shape of the inner element 22 alters the path of movement of the particles, especially the larger ones, causing them to take on a vortical path. The resulting axially oriented streams of dirt move generally along the longitudinal axis 37 of each unit 17, pass through the neck 21, and enter into the dirt-discharge pipe 29.

In the arrangement illustrated in FIGURE 1, each row of dirt discharge pipes 29 is coupled into a horizontally aligned conduit 38. This coupling is conveniently provided by a cleanout, having a suitable opening along one wall for receiving a dirt discharge pipe 29, and with at least one other opening for communicating with the horizontally aligned conduit 38. As can clearly be seen from FIGURE 1, the boxes 39 arranged in the right-handmost column are provided with only one opening communicating with the horizontally aligned conduit 38 located along their left-hand walls, while the boxes of the remaining three columns are provided with openings in both their left- and right-hand walls which communicate with the hollow conduit 38.

The box 39 is provided with a sliding panel 40, guided by flangers 41 and 42 for sealing the rearward wall thereof when in the position shown in FIGURE 1. Each sliding panel is provided with a flange 43 at its upward end to facilitate gripping thereof in order to guide the panel 40 vertically upward for access to the interior of the box and the conduit for cleaning, maintenance or other purposes.

The left-hand ends of each conduit 38 communicate with an opening provided in a vertically disposed manifold 44. An exhaust fan is mounted within a housing 13 and is driven by a motor, shaft 14 of which is shown. The exhaust fan preferably has a capacity sufficient to draw the dirt particles entering dirt-discharge pipes 29 into the conduits 38 and the manifold 44.

The conduits 38 servicing the upper and lower rows of the planar array direct the dirt passing therethrough into the upper and lower ends respectively of manifold 44. The dirt particles entering the upper and lower ends of 44 converge in the intermediate region; and are discharged through pipe 45 by the action of the exhaust fan; at a location which is isolated from the circulating cleaned air.

The intermediate region of manifold 44 is fitted with a pair of curved deflection plates 46 and 47 which divert particles emerging from the left-hand-end of the conduit 38 servicing the intermediate row of filter elements around the upper and lower ends respectively of deflection plates 46 and 47. The particles converge on the left-hand side of the deflection plates and are drawn through and discharged from outplet pipe 45.

The lower end of vertically aligned manifold 44 communicates with a cleanout box 15, in which collect particles that reach manifold 44, but fail to pass out through outlet pipe 45. The box 15 is provided with flanges 159 and 156 along its rearward surface for guiding the removal panel 48. In the position shown in FIGURE 1, panel 48 acts to effectively seal box 15. Panel 48 is provided with a flange 49 at its upward edge which facilitates lifting of the panel to gain access to the interior of box 15 for cleaning, maintenance, or other purposes.

While FIGURE 1 shows a planar array of twelve units 17 arranged in a regular matrix of 4 columns and 3 rows, it is to be understood that a greater or lesser number of filter units may be employed depending only upon the configuration and dimensions of the plenum. Also, the units 17 need not be formed in the exact manner as shown in the figures, but may assume other than configurations shown at their upstream and downstream ends so long as the inner surface thereof is of such shape, i.e., substantially conical or pyramidal or tapered configuration, between the upstream and downstream ends thereof to impart vortical movement to the particles passing therethrough.

The channels 20 which position and support the individual units 17 arranged within the framework 12 may in turn be suitably supported by bracing struts 50 which are secured at their forward ends to the framework 12 and at their rearward ends to the conduits 38. The actual bracing framework may however, take any desired form with the bracing framework of FIGURE 1 being merely exemplary.

Figure 4:
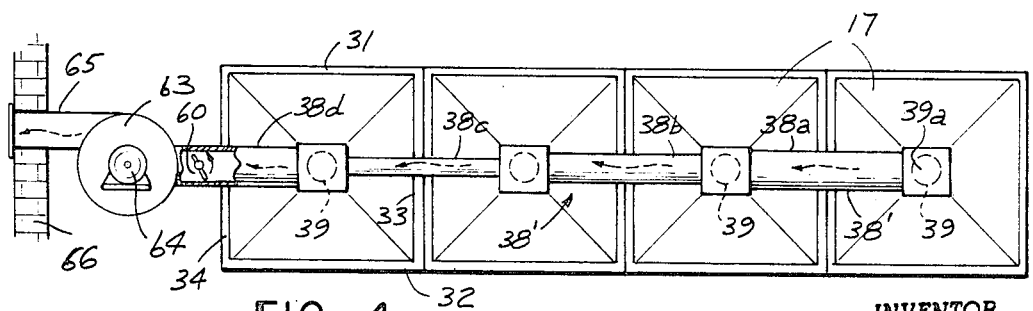
FIGURE 4 shows a rear elevational view of a filter system designed in accordance with the principles of the instant invention, and which consists of a linear array of such units and conduits.

FIGURE 4 shows a linear array of units 17 each having their downstream neck portions communicating with an associated discharge pipe 29. Each of the boxes 39 is provided with an opening 39a in its forward wall for communicating with an associated discharge pipe. The horizontally aligned conduit 38' shown in FIGURE 4 is comprised of individual sections 38a, 38b, and 38c of decreasingly smaller diameter moving from the right to the left of the linear array The furthest left-hand section 38d of conduit 38' has a diameter substantially identical to the diameter of section 38a and couples the opening in the left-hand wall of its associated box 39 with the right-hand opening in a housing 63 which contains an exhaust fan driven by a motor 64, so as to expel the dirt through a discharge pipe 65, shown passing through a suitable opening in the building wall 66.

Conduit section 38d is fitted with a pressure sensitive damper 60 which can be used in lieu of the exhaust fan, i.e., if no fan is present or if it is not operated. The damper opens when the air pressure is greater on its right-hand side to permit the passage of dirt from the conduit 38 to the exterior of the building. When the air pressure on the left-hand side of damper 60 is greater, the damper remains closed thereby preventing the flow of air from the exterior of the building into the conduit sections 38a through 38d. As mentioned, the damper is operative if motor 64 is shut off.

As shown in FIG. 1, the individual sections of the horizontally aligned conduits 38 progressively decrease in size in the same way as those of 38'.

The relative porosities of the filtering media of the inner and outer elements can readily be selected. When the porosity of the inner element is less than that of the outer element, the effect thereof is to increase the vortical movement within the unit with consequent enhancement of the dirt-removing efficiency thereof.

From the foregoing description it is evident that the instant invention provides a dirt-removing or filtration system which carries off a major amount of particles extracted from air passing through the system so as to prevent the lodging and accumulation thereof in the units, thereby eliminating the need for frequent removal, cleaning and/or replacement of the filter elements encountered in the operation of air filtration systems using conventional filters. Each dirt-removing unit within the system has a configuration which imparts vortical movement to dirt entrained in the instreaming air of a circulating air system, and greatly facilitates the removal of these particles from each such unit by means of a conduit network which discharges the dirt at a location removed from the circulating air system.

This invention thus provides for outstanding diminution in the costs and expenses, both in labor and materials, of maintaining circulating air systems stripped of the dirt entrained in the air which enters the air-intake chamber.

I claim:

1. A particle separating assemblage for purifying a particle laden air flow, said assemblage comprising in combination:

a plurality of air filtering units, each of said units including a plurality of side by side air permeable filter member, each defining a generally tapered particle separation chamber, the wide end of the filter member constituting an air intake end and the narrow end a discharge end, said units being mounted at several superimposed levels and the intake ends of the filter members being disposed in a common plane defining an angle with said levels;

a plurality of interconnecting conduits, one disposed at each of said levels and interconnecting the discharge ends of the filter members in each respective level with each other;

a common discharge conduit including an exhaust port, each of said plurality of interconnecting conduits connected to and discharging into said common discharge conduit; and a suction means connected to said common discharge conduit for generating a suction action in said filter members, said interconnecting conduits and said common discharge conduit;

whereby particles suspended in a particle laden air stream directed into the intake ends of the units are at least substantially retained by the filter members thereof and at least part of the air substantially liberated of particles escapes through said members, the remaining particles laden air being exhausted through said exhaust port via the discharge ends of said filter members, said interconnecting conduits and said common discharge conduit.

2. An assemblage according to claim 1 wherein said filtering units are disposed in columns and rows.

3. An assemblage according to claim 1 wherein each of the filter members of each unit comprises an inner generally tapered porous filter element and an outer porous filter element encompassing the inner element spaced apart therefrom to define an air space between the two elements, the filter elements being joined to each other at the intake end and the discharge end of the filter member, and wherein a stiffening frame is fitted in the intake end of each filter member to define the outline thereof, the frames of adjacent units being sealed to each other to form a plenum in said plane.

4. An assemblage according to claim 1 wherein said suction means and said exhaust port are disposed adjacent to an intermediate one of the levels in which said units are disposed, said common discharge conduit having an open ended portion below the lowest level of said conduits, and wherein a particle collector is connected to said open end for gravity separation of particles in the air flow through said common discharge conduit.

5. An assemblage according to claim 1 wherein said suction means comprises a pressure sensitive damper disposed in said common discharge conduit anterior of the exhaust port and in the flow direction of the air flow, said damper being set to open in response to a higher air pressure on the upstream side of the damper than on the downstream side and to close in response to a higher air pressure on the downstream side than on the upstream side of the damper.

6. An assemblage according to claim 1 wherein each of said filter members is elongated at its discharge end to form a neck portion, and a coupling housing is secured to each neck portion in communication therewith, said interconnecting conduits extending between adjacent housings of units disposed in the same level and between said common discharge conduit and the housing next adjacent thereto.

7. An assemblage according to claim 6 wherein the cross-section area of the interconnecting conduit portions between the discharge ends of each two adjacent units in the same level decreases from conduit portion to conduit portion in the direction toward said common discharge conduit.

(References on following page)

References Cited

UNITED STATES PATENTS

| | | | |
|---|---|---|---|
| 605,363 | 6/1898 | Troutt. | |
| 879,663 | 2/1908 | McIvor. | |
| 1,048,477 | 12/1912 | Allington | 55—419 X |
| 1,182,404 | 5/1916 | Noguchi | 55—380 X |
| 1,782,531 | 11/1930 | Fokker | 210—459 X |
| 1,821,202 | 9/1931 | Birkholz | 55—431 X |
| 2,032,579 | 3/1936 | Johnson. | |
| 2,152,115 | 3/1939 | Van Tongeren. | |
| 2,712,858 | 7/1955 | Wintermute. | |
| 2,853,151 | 9/1958 | Guldemond | 55—443 X |
| 2,853,154 | 9/1958 | Rivers | 55—341 |
| 2,924,062 | 2/1960 | Sutcliffe. | |
| 2,979,754 | 4/1961 | Harris | 15—347 X |
| 3,264,806 | 8/1966 | Nevmann | 55—341 X |

FOREIGN PATENTS

| | | |
|---|---|---|
| 15,381 | 1908 | Great Britain. |
| 388,627 | 3/1933 | Great Britain. |
| 699,670 | 11/1953 | Great Britain. |
| 129,415 | 7/1950 | Sweden. |

HARRY B. THORNTON, *Primary Examiner.*

DENNIS E. TALBERT, JR., *Assistant Examiner.*